(12) United States Patent
Seitz et al.

(10) Patent No.: US 7,995,331 B2
(45) Date of Patent: Aug. 9, 2011

(54) CONSOLE FOR A MACHINE TOOL

(75) Inventors: Reinhold Seitz, Hopferau (DE); Karl Lechleiter, Oy-Mittelberg (DE); Dominic Schindler, Lauterach (AT)

(73) Assignee: Deckel Maho Pfronten GmbH, Pfronten (DE)

( * ) Notice: Subject to any disclaimer, the term of this patent is extended or adjusted under 35 U.S.C. 154(b) by 147 days.

(21) Appl. No.: 12/195,341

(22) Filed: Aug. 20, 2008

(65) Prior Publication Data

US 2009/0050781 A1 Feb. 26, 2009

(30) Foreign Application Priority Data

Aug. 22, 2007 (DE) .................... 10 2007 039 640

(51) Int. Cl.
*H05K 5/00* (2006.01)
*E04G 3/00* (2006.01)
*A47B 81/00* (2006.01)

(52) U.S. Cl. ......... 361/679.06; 361/679.07; 361/379.02; 361/379.21; 361/379.22; 361/679.23; 248/278.1; 248/279.1; 312/223.1; 312/223.2; 312/223.3

(58) Field of Classification Search ........... 361/679.01–679.09, 679.61, 679.55; 248/276.1, 278.1, 917, 919, 920, 921, 288.11, 248/918, 922; 174/50–51
See application file for complete search history.

(56) References Cited

U.S. PATENT DOCUMENTS

| 5,673,628 | A  | * | 10/1997 | Boos ............................. 108/44 |
| 5,751,548 | A  | * | 5/1998  | Hall et al. ................. 361/679.41 |
| 6,179,263 | B1 | * | 1/2001  | Rosen et al. ............... 248/278.1 |
| 6,269,578 | B1 | * | 8/2001  | Callegari ......................... 42/94 |
| 6,364,268 | B1 | * | 4/2002  | Metelski ...................... 248/317 |
| 2004/0179331 | A1 | * | 9/2004 | Maloney ...................... 361/680 |
| 2005/0040299 | A1 | * | 2/2005 | Twyford .................... 248/177.1 |
| 2005/0183320 | A1 | * | 8/2005 | Krien et al. ..................... 42/94 |
| 2006/0279921 | A1 | * | 12/2006 | Stinson ........................ 361/683 |

FOREIGN PATENT DOCUMENTS

| DE | 20204448 U1 | 8/2002 |
| DE | 202007008317 U1 | 9/2007 |

* cited by examiner

*Primary Examiner* — Jayprakash N Gandhi
*Assistant Examiner* — Jerry Wu
(74) *Attorney, Agent, or Firm* — The Maxham Firm

(57) ABSTRACT

A console for a machine tool comprising a housing mounted on a pivotable supporting arm, a keypad arranged in the housing, and an upper display unit including a screen. The housing is formed with a lower housing shell including the keypad, and a separate upper housing part including the upper display unit. The lower housing shell and the upper housing part are formed so as to be separately pivotable and lockable in preferred operating positions.

18 Claims, 5 Drawing Sheets

CONSOLE FOR A MACHINE TOOL

FIELD OF THE INVENTION

The invention relates generally to a console for a machine tool which console includes a housing mounted on a pivotable supporting arm, a keypad arranged in the housing and having a keyboard as well as other functional elements, and an upper display unit having a screen as well as other display elements.

BACKGROUND OF THE INVENTION

Consoles are an important constituent of modern program-controlled machine tools since they form the functional interface between the operator and the program control of the machine tool. Depending on the machine type and the functions of the respective machine tool different consoles are used which are either directly mounted to a part of the machine wall or the protective cabin with their respective, inherently stable housing or arranged in the surroundings of the machine. In case of complex machining centers such as, particularly, lathe and milling centers, consoles attached to the free end of a supporting arm with their stable housing are common. The supporting arm generally comprises a horizontal arm portion hinged to the base of the machine tool so as to be pivotable about at least one vertical axis. This horizontal arm portion is followed by an arm portion directed upwardly on the free end of which the console is mounted. The respective length of the horizontal arm portion and the arm portion pointing upward are determined so that the console can be moved in a sufficiently large pivoting arc and is arranged in an ergometrically optimized height and inclination. The housings of such consoles are generally integrally formed and comprise a keypad oriented transversely in space in their lower part, a number of operating buttons being provided on the keypad in addition to a character and numerical keyboard. An upper housing portion comprising at least one display unit including a screen facing the operator is integrally formed with the lower housing portion.

SUMMARY OF THE INVENTION

It is a purpose of the invention to provide a console usable for different machine types in which the operation of the keypad and the recognizability of the matters displayed on the display unit are optimized.

According to an embodiment of the invention, the purpose is satisfied by the housing comprising a lower housing shell including the keypad and a separate upper housing part including the upper display unit. The lower housing shell and the upper housing part are formed so as to be pivotable and lockable in preferred operating positions.

The orientation of the lower housing shell including the integrated keyboard in different inclinations enables an adjustment of the operating position of the keypad to individual requirements of the operator, for example, his body size. If particularly time-consuming programming work is to be carried out while sitting the keypad may be pivoted to a corresponding inclined position together with the lower housing shell. According to the invention the upper housing part can preferably also be separately pivoted into a desired spatial position with respect to the lower housing part which allows for an adjustment to individual requirements of the operator in this case as well. For example, the display unit may be inclined together with the upper housing part so that optimum contrasts and a minimum dazzling effect can be obtained.

According to a preferred embodiment of the invention the lower housing shell and the upper housing part are supported on a common hollow shaft which is preferably oriented horizontally. Preferably the hollow shaft is disposed on the rear end portion of the lower housing shell and on the lower end portion of the upper housing part. Bush-like bearing arrangements of the two housing parts respectively surround the hollow shaft.

According to an advantageous embodiment of the invention a bearing arrangement fixedly connected to the upper end of the supporting arm is provided on the hollow shaft. The supporting arm is hollow in the conventional manner and comprises an internal cable passage continued in the bearing arrangement and then in the hollow shaft. In this way a fail-safe and, if required, easily accessible cable guidance is obtained. For introducing the different cable harnesses into the interior of the lower housing shell on the one hand, and into the interior of the upper housing part on the other, lateral apertures are formed in the hollow shaft which are sufficiently large to enable a damage-free passing-through of the cables in the various pivoting positions of the housing components.

In a preferred embodiment of the invention the locking of the lower housing shell may be carried out with the aid of one or more locking mechanisms. The upper housing part, including the display unit, may also be locked in a selected operating position by means of the same locking mechanisms. However, there is also the possibility to lock the two housing parts, that is, the lower housing shell and the upper housing part, respectively, in selected operating positions by means of separate catch or clamping mechanisms.

For example, a pressure means cylinder, the piston of which acts on a preferably bowl-shaped clamping element and presses it against a surface-treated jacket surface of the hollow shaft, may be arranged in the lower housing shell transverse to the hollow shaft. Instead or in addition axial clamping means may be used, for example, in the form of a cover comprising a tightening screw which exerts an axial pressure on the bearing arrangements of the two housing parts and causes a mutual clamping of the bearing arrangements.

Following the example of the operation of PCs, the operation of the console according to the invention may also be carried out using a so-called computer mouse. This type of operation is enabled by the provision of a laterally projecting, pivotable support plate for a mouse functionally connected to the control elements of the console and operated by the operator moving it on the support surface. Conveniently, the support plate is supported on the hollow shaft via a rear fastener and lockable in an approximately horizontal operating position. The support plate may be pivoted from its operating position into a standby position separately or together with the lower housing shell. In the position in which it is pivoted so as to be approximately vertical the support plate may also serve as a document clamp. Aside from that there is also the possibility to provide a laterally protruding, plate-like document clamp to be mounted on the lower rear side of the upper housing part and adjacent thereto.

An advantageous embodiment of the invention is characterized in that authorization buttons for different modes of operation and different persons as well as for an overriding key seating are provided on the lower housing shell, preferably on one of its side walls.

To render time-consuming work at the console comfortable and to avoid excessive symptoms of fatigue an adjustable seat, which can be displaced from a stand-by position to an operating position, is provided for the operator. Conveniently the seat comprises a horizontal, preferably cylindrical, upholstered seat member and a telescopic, longitudinally adjustable supporting beam pivotably supported on the hollow shaft so as to be lockable in predetermined operating positions.

BRIEF DESCRIPTION OF THE DRAWING

Embodiments of the invention will be explained in greater detail using the attached drawing figures that represent merely one method of implementation, wherein.

DETAILED DESCRIPTION OF THE PREFERRED EMBODIMENTS

Figure 1:
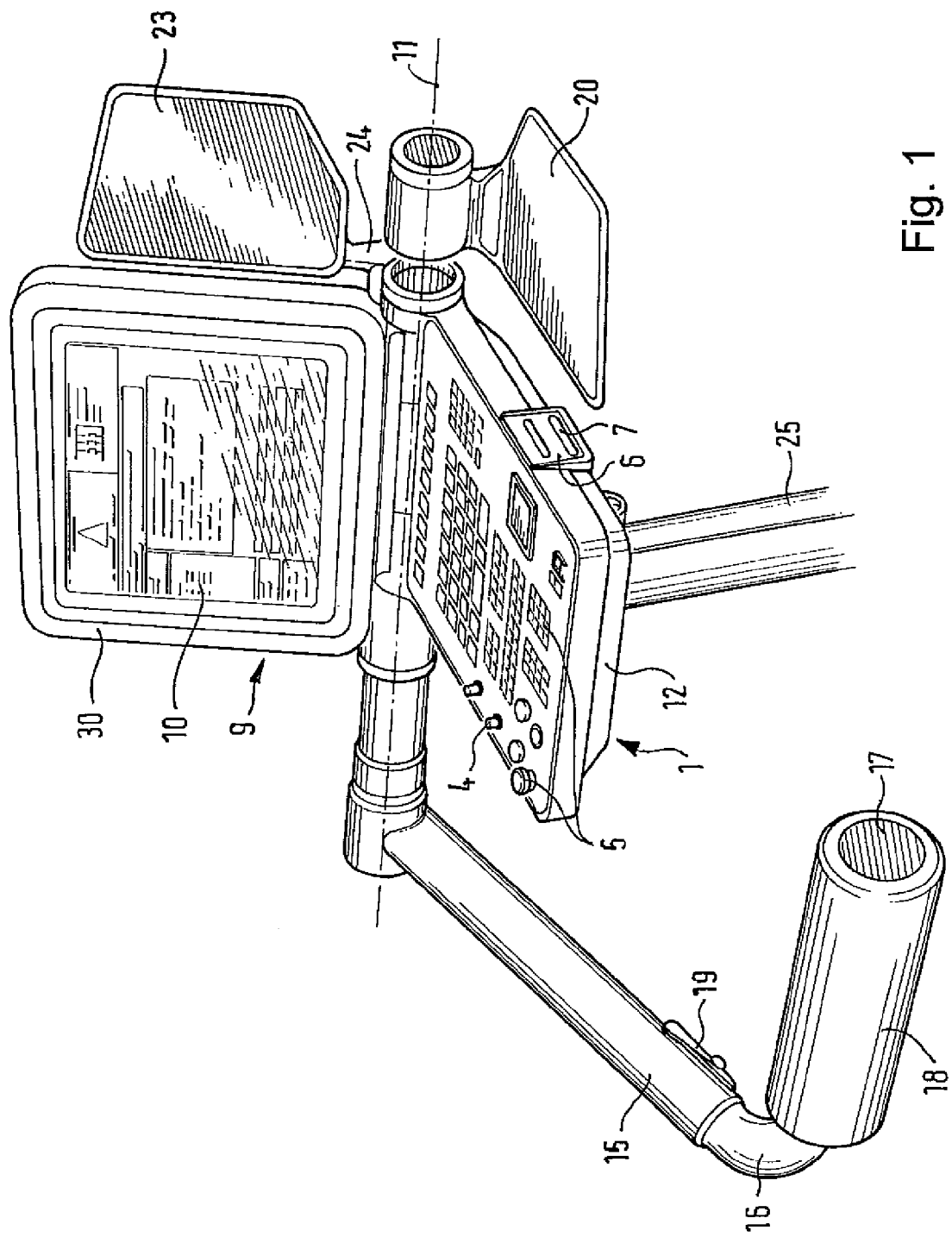
FIG. 1 is a perspective overall view of a console according to the invention.

As can be seen in FIG. 1, the console according to the invention comprises a lower housing shell 1, the upper side of which is covered by keypad 2 on which switches, keys and displays 4, 5 are disposed. On the right (in this view) side wall of lower housing shell 1 authorization buttons 6 for various modes of operation and different persons, as well as key seating or receptacle 7, are provided in which a particular key, a code card, or another identification device is inserted by the respective authorized person.

An upper flat housing part 9 in which large screen 10 is installed is pivotably supported on the rear edge of lower housing shell 1. The lower housing shell and upper housing part 9 may perform pivoting movements about horizontal axis 11 individually or together, or both, and they may be locked and secured against a further unintended rotation in preferred operating positions by operating suitable locking mechanisms, for example, by pressing button 12 provided on the hidden face of the lower housing shell. Lower housing shell 1 and upper housing part 9 consist of a cast aluminum alloy in this embodiment. They may, however, also be fully or partly formed of another metal or a suitable plastic material, or both.

Hollow shaft 13, described in more detail below with reference to FIGS. 2 and 3, serves as a connecting element between the lower housing shell and the upper housing part. On the left (as viewed in FIG. 1) end of hollow shaft 13 pipe-shaped supporting beam 15 is pivotably and arrestably supported. Telescoping pipe 16 is accommodated in supporting beam 15 so as to be longitudinally shiftable. The telescoping pipe has rectangularly bent section 17 carrying cylindrical seat cushion 18. Locking mechanism 19 serves to lock telescoping pipe 16 in a selected extended position in supporting beam 15. Supporting beam 15 is pivotably supported on the left end portion of hollow shaft 13 with its upper end and can be locked in a retracted stand-by position as well as in at least one extended operating position, as illustrated.

On the right side of the lower housing shell support plate 20 is provided which can be fixedly connected to the lower housing shell and carries out pivoting movements with it. The support plate, however, may also be pivotably mounted on hollow shaft 13 or on lower housing shell 1 via its own bearings or joints. Support plate 20 serves as a support for a PC mouse for using various functions of the console or of the machine control.

Further, plate-shaped document clip 23 may be provided on the right side of upper housing part 9. The document clip is attached to the lower rear side of the upper housing part via a base in the embodiment shown so that it is pivoted with upper housing part 9. Document clip 23 may also be provided with joints enabling an independent retraction or extension into a suitable operating position.

Figure 3:
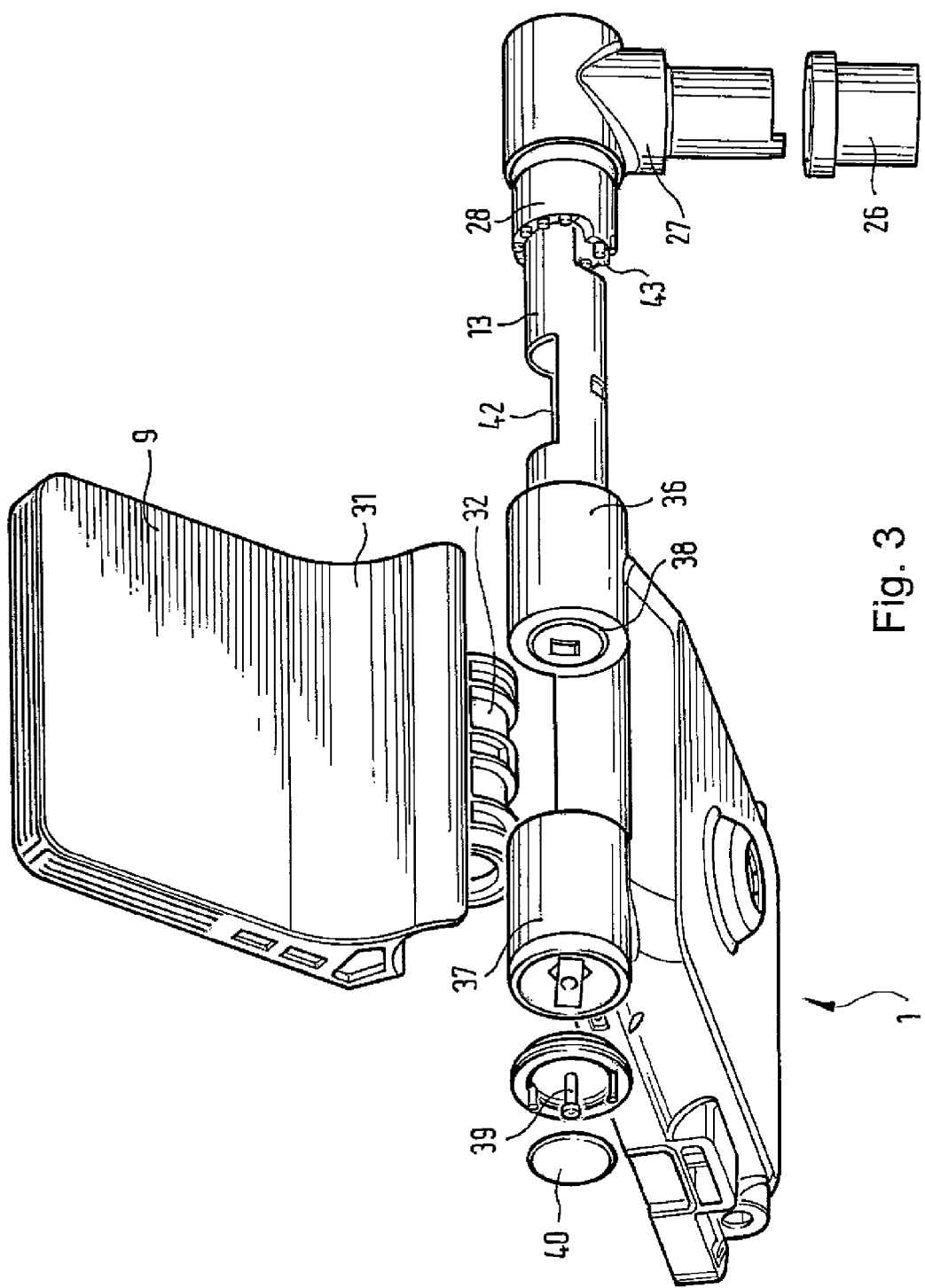
FIG. 3 is a perspective rear view of the housing parts of the opened console according to the embodiment shown in FIG. 1.
Figure 4:
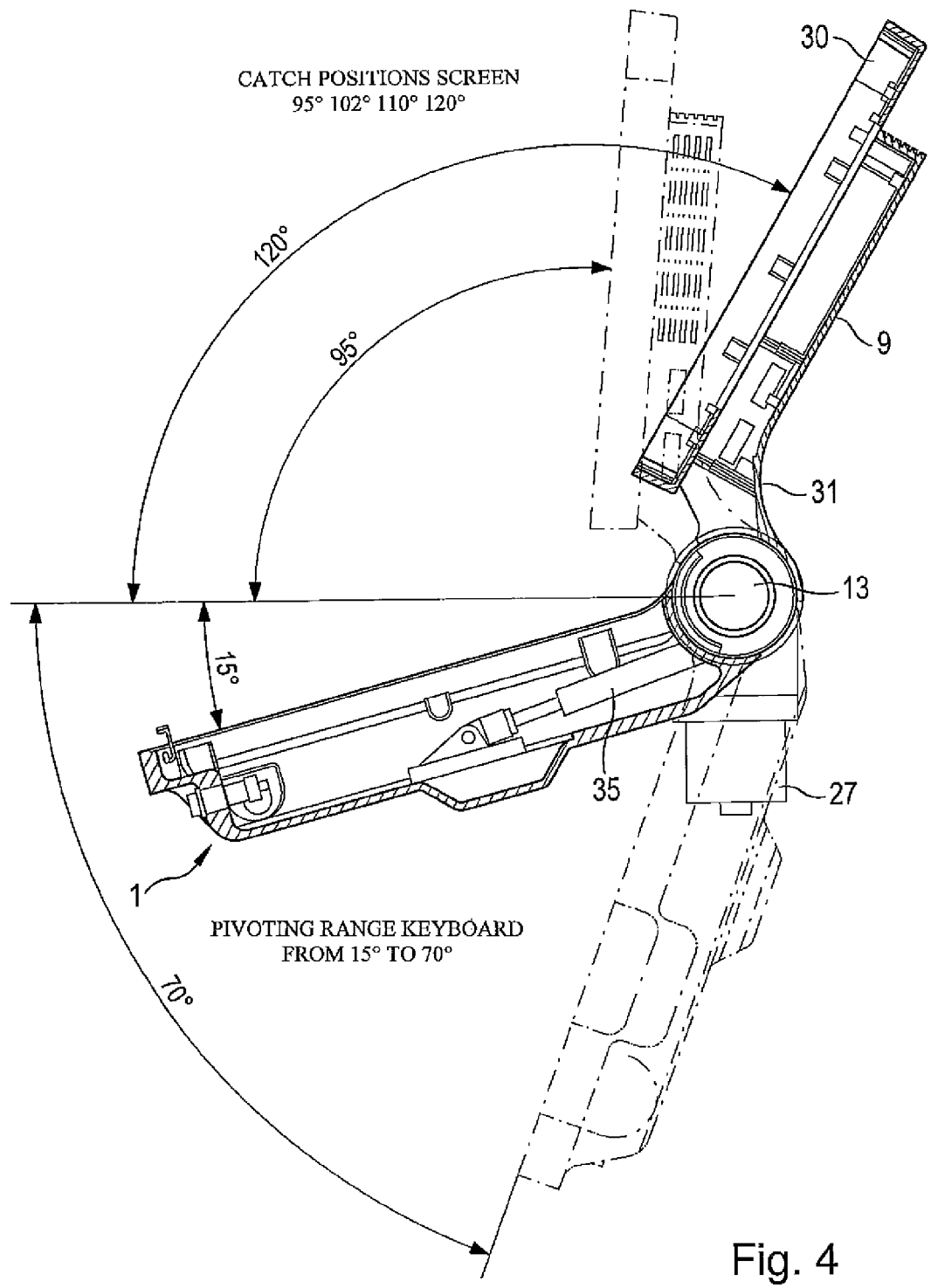
FIG. 4 is a vertical cross sectional view of the housing parts of the console according to the embodiment shown in FIG. 1, showing different positions of the screen and the keyboard.

The console shown in FIG. 1 is supported on a portion of supporting arm 25 directed upward with its lower housing shell 1, upper end bush 26 of the supporting arm being rotatably supported on hollow shaft 13 via hollow T-piece 27 (see FIGS. 3 to 4). The pivoting position of the respective housing parts 1, 9 can be limited to the angle ranges shown in FIG. 4 with the aid of limitation stoppers 28 (FIG. 3).

Figure 2:
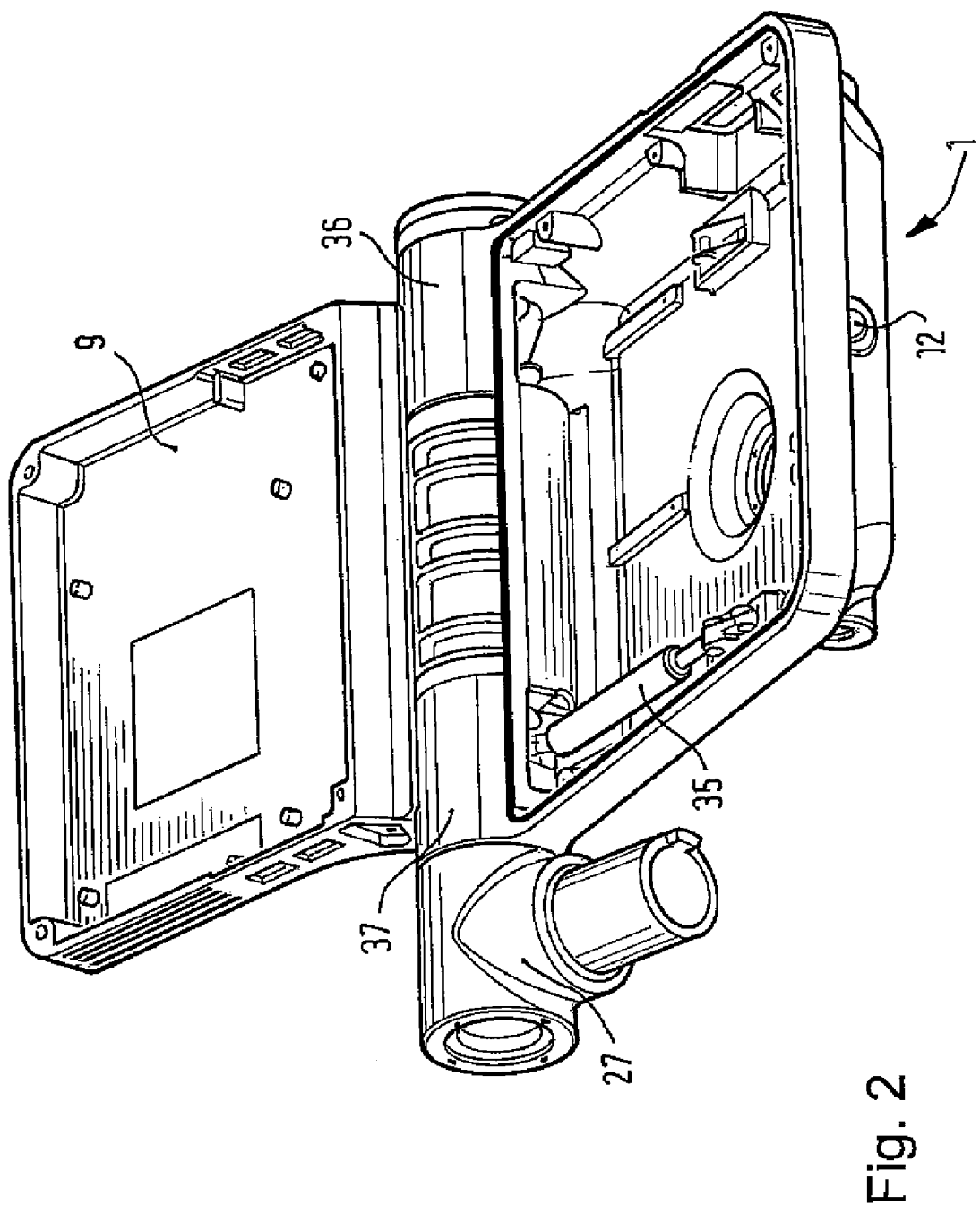
FIG. 2 is a perspective front view of the housing parts of the opened console according to the embodiment shown in FIG. 1.

As can be seen in FIG. 2, upper housing part 9 in the shape of a flat box is formed of, for example, a cast aluminum alloy or a suitable plastic material and has a smaller width than lower housing shell 1. On the upper housing part, frame 30, shown in FIG. 1 and surrounding screen 10 on all sides, is fixed, for example, by means of screws. In the flat interior of the upper housing part different elements are arranged, for example, for controlling the screen, which are connected to the main control of the machine tool via cables (not shown).

As can be seen in FIG. 3, upper housing part 9 comprises arcuate portion 31 in its lower portion on the central part of which bearing bushes 32 protruding downwardly are formed or fixed. Document clamp 23 may be attached to arcuate portion 31 via leg 24 (FIG. 1).

According to FIGS. 2 and 3, lower housing shell 1 has a greater width and depth than upper housing part 9. The lower housing shell is conveniently formed of a cast aluminum alloy or a suitable plastic material as well. Pressure means cylinder 35, operated by face-side button 12 and acting on a bowl-shaped clamping piece (not shown) exerting a pressure on a jacket surface of hollow shaft 13 and locking the lower housing shell with respect to a displacement, is disposed in the interior of the lower housing shell in the left portion, as seen in FIG. 2.

On the rear broadside of lower housing shell 1 two bearing bushes 36, 37 are formed in the space between which bearing bush 32 of upper housing part 9 formed on the lower end of arcuate portion 31 is engaged. In the assembled state hollow shaft 13 is accommodated in the three bearing bushes 32, 36, 37. In the faces of bearing bushes 36, 37, O-shaped clamping rings 38 are arranged. By tightening screw 39 in cover 40 an axial load acting as a twist-inhibition or safeguard against a rotation is applied to bearing bushes 36, 37, and 32.

According to FIG. 3, two lateral apertures 42, 43 are formed in hollow shaft 13 and provide for guiding the cables (not shown) into the interior of upper housing part 9 on the one hand and into the interior of lower housing shell I on the other hand.

FIG. 4 shows preferred pivoting ranges of lower housing shell 1 including the keyboard and upper housing part 9 including the screen surrounded by frame 30. The pivoting range of the lower housing shell including the keyboard is between about 15° and about 70° with respect to the horizontal plane, and the pivoting range of the upper housing part including the screen (monitor) is maximally about 120°. The upper housing part 9 is manually lockable by the operator in predetermined latching positions such as 95°, 102°, 110°, and 120°, for example.

Figure 5:
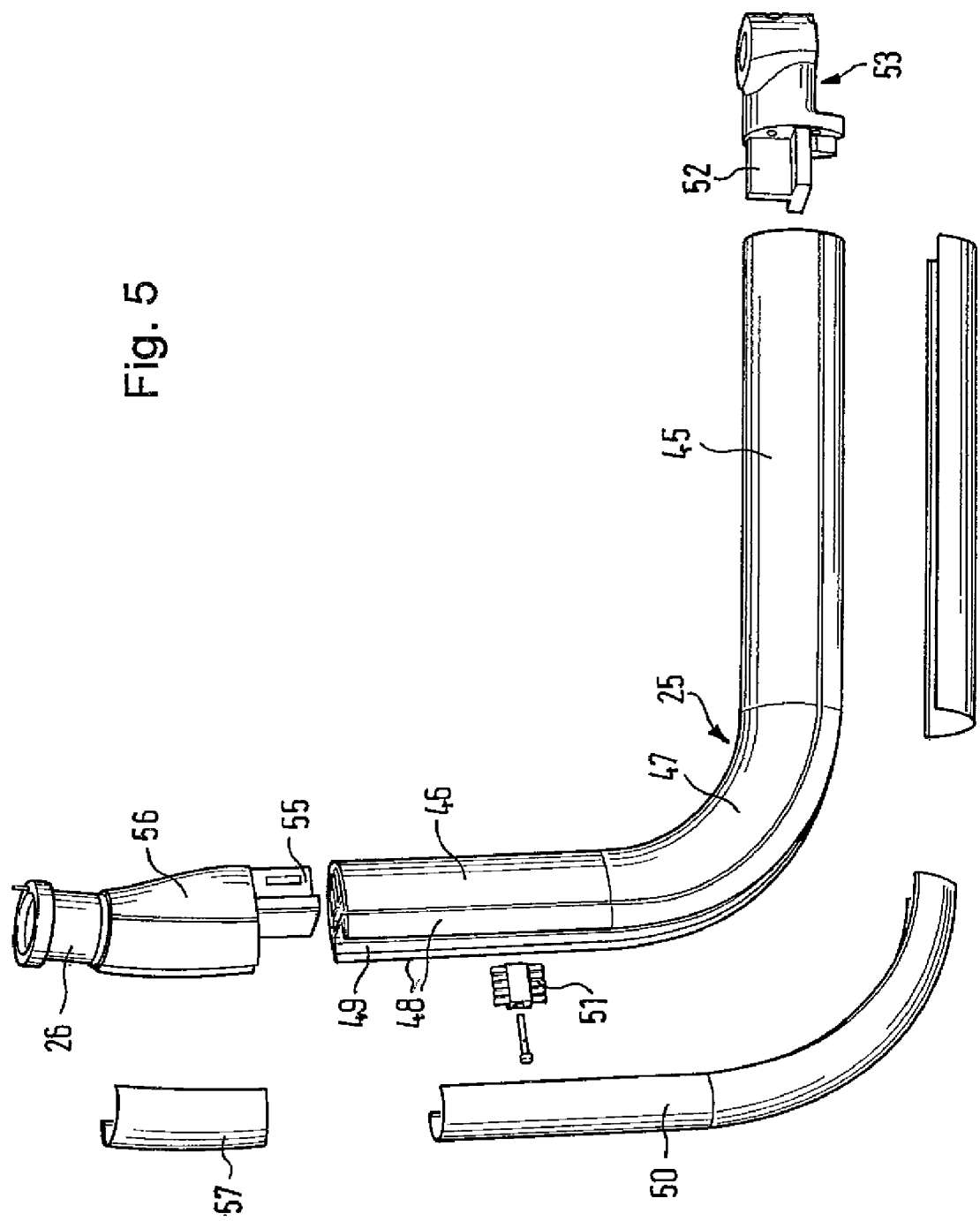
FIG. 5 is an exploded perspective view of a supporting arm for the console articulately mountable to the machine tool of FIG. 1.

In FIG. 5 an embodiment of bent supporting arm 25 comprising horizontal portion 45, a portion 46 extending vertically here, as well as arcuate intermediate portion 47 can be seen. The entire supporting arm 25 consists of an extruded hollow light metal profile having an approximately elliptical cross section and formed with a plurality of radially extending and axially continuous stiffening fins in its interior. An outer side serves as a cable passage and is defined by two lateral cheeks 48. Cable passage 49 is covered by arcuate cover element 50. For securing the plurality of different cables extending in the cable passage cable holder 51 is provided which is formed as an elastomer block and comprises a plurality of adjacent holes for accommodating and securing one cable, respectively.

A T-piece 52 engages in the machine side end of horizontal portion 45 of supporting arm 25. The T-piece forms a part of pivoting bearing 53 via which supporting arm 25, and thus the console, is hinged to the base of a machine tool so as to be pivotable about a vertical axis. In the pivoting bearing, torsion spring elements (not shown) are provided.

T-piece 55 of hollow connecting part 56 engages in the upper end of vertical portion 46 of supporting arm 25. One side of T-piece 55 is covered by cover 57. Collar bush 26, shown in FIG. 3, engages in connecting part 56.

The invention is not limited to the illustrated embodiments. For example, housing parts 1, 9 may also be formed of other suitable materials and have another shape depending on the size and number of their components. The important issue is that they are arranged so as to be pivotable relative to each other and in space which allows for a favorable position in space for the operator and observer.

What is claimed is:

1. A console for a machine tool comprising:
    a housing mounted on a pivotable supporting arm, said housing comprising:
        a lower housing shell; and
        an upper housing part;
    an upper display unit comprising a screen arranged on said upper housing part;
    a keypad arranged on said lower housing shell; and
    means to enable said upper housing part and said lower housing shell to be individually, selectively, pivotable and lockable in preferred operating positions with respect to the machine tool; wherein
    said supporting arm is formed as an extruded hollow profile in the machine side end portion of which a T-piece of a pivoting bearing fixed to the machine base is engaged and into the upper end portion of which a T-piece of a connecting part is inserted.

2. A console for a machine tool, the console comprising:
    a housing comprised of a lower housing shell and an upper housing part;
    an upper display unit comprising a screen arranged on said upper housing part;
    a keypad arranged on said lower housing shell; and
    a shaft having a generally horizontal axis;
    said lower housing shell and said upper housing part each being generally rectangular in shape and having a width side and a depth side, the respective width sides being parallel and hinged together on said shaft, the respective depth sides being oriented radially with respect to the horizontal axis, said lower housing shell and said upper housing part being individually, selectively pivotable about said shaft and lockable in selected operating positions on said shaft.

3. The console according to claim 2, and further comprising a support beam adapted to be pivotably mounted at a first end to a machine tool, said shaft being pivotably mounted to a second end of said support beam.

4. The console according to claim 3, wherein said support beam is generally hollow.

5. The console according to claim 3, and further comprising a bearing arrangement serving as a connecting element to said second end of said support beam.

6. The console according to claim 5, wherein said support beam, said bearing arrangement, and said shaft are configured with a cable feed-through means.

7. The console according to the claim 6, and further comprising lateral apertures in said shaft for feeding cables through into said lower housing shell and into said upper housing part.

8. The console according to claim 7, and further comprising a laterally projecting, pivotable support plate.

9. The console according to claim 8, wherein said pivotable support plate is supported on the hollow shaft via a rear side support and pivotable together with said lower housing shell.

10. The console according to claim 3, wherein said support beam is formed as an extruded hollow profile having at said first end a T-piece comprising a pivoting bearing adapted to be fixed to the machine tool.

11. The console according to claim 2, and further comprising separate or common clamping or catch mechanisms for locking said lower housing shell and said upper housing part in said respectively preferred operating position.

12. The console according to claim 2, and further comprising a laterally projecting, pivotable support plate coupled to said lower housing shell.

13. The console according to claim 12, wherein said pivotable support plate is supported on the hollow shaft via a rear side support and pivotable together with said lower housing shell.

14. The console according to claim 2, and further comprising a laterally protruding, pivotable document clamp coupled to said upper housing part.

15. The console according to claim 14, wherein said document clamp is plate-shaped and is mountable on said upper housing part so as to protrude laterally.

16. The console according to claim 2, and further comprising authorization keys on the lower housing shell for different operating modes and operating persons as well as an overriding key setting.

17. The console according to claim 2, and further comprising a seat displaceable from a stand-by position to an operating position for an operator.

18. The console according to claim 17, wherein said seat comprises a horizontal seat element and a telescopic, longitudinally adjustable supporting beam mounted on said shaft so as to be pivotable and lockable.

* * * * *